United States Patent

Vierstraete

[15] 3,685,915
[45] Aug. 22, 1972

[54] APPARATUS FOR MACHINING ELONGATED WORKPIECES

[72] Inventor: Jean Vierstraete, 83, rue Victor-Hugo, 62 Oignies, France

[22] Filed: May 7, 1969

[21] Appl. No.: 822,525

[30] Foreign Application Priority Data

May 9, 1968 France.........................19099
June 26, 1968 France.........................19147

[52] U.S. Cl. .....................408/26, 408/51, 408/237, 29/26 R
[51] Int. Cl. .......................B23b 39/22, B23b 39/18
[58] Field of Search .......29/565, 26, 26.1; 77/21, 22; 908/26, 51, 237; 90/17, 13, 15; 143/47; 83/624, 625, 626

[56] References Cited

UNITED STATES PATENTS

| | | | |
|---|---|---|---|
| 1,022,051 | 4/1912 | Shanks | 29/26 |
| 2,310,870 | 2/1943 | Retterath | 90/17 X |
| 2,211,082 | 8/1940 | Smith | 143/47 C |
| 2,747,469 | 5/1956 | Ernst et al. | 90/13 |

FOREIGN PATENTS OR APPLICATIONS 306,427 6/1955 Switzerland..................90/17
773,319 4/1957 Great Britain.................90/15

*Primary Examiner*—Andrew R. Juhasz
*Assistant Examiner*—Z. R. Bilinsky
*Attorney*—Ernest G. Montague

[57] ABSTRACT

Elongated workpieces such as structural profile members are machined on apparatus suitable for drilling holes or performing other operations at predetermined points by equipment comprising a support with rollers on which the workpiece can be displaced, said support comprising a portal member spanning the workpiece and embodying a tool-carrying cross member having suitable driving tool spindles. The workpiece is located on the support rollers and held in position by vertical and horizontal guide rollers on the portal unit which are pressed into engagement with the workpiece. The cross member which may carry drills or the like is operable towards the workpiece with a cutting feed by means of hydraulic piston devices, and locating means are provided for correctly positioning the workpiece on the rollers. Lengthwise positioning of the cross member is effected by means of an indicator device with a floating zero system which is operated by the displacement of the portal member on the support and is thus available for determining the position of the portal member for effecting drilling at the required points of the workpiece.

22 Claims, 12 Drawing Figures

APPARATUS FOR MACHINING ELONGATED WORKPIECES

The present invention relates to an apparatus for machining elongated workpieces, in particular for producing apertures in profiled members and sheet material, comprising a support on which the workpieces to be machined are supported and above which there is disposed a portal member over the surface thereof having a tool-carrying cross member to support tools in an adjustable manner, the position of the portal member being adjustable and located by measuring means. The tools used may be drills, broaches, punches, boring devices, sawing devices and so on.

In existing machines, the components to be machined, for example, structural beams and profile members, are not necessarily held parallel to the travelling guideways of the machine. In order to machine them and to maintain the cant lines relatively to the center member and the flanges of the beam or profile, it is necessary to sense the reference faces of the beam or profile and to apply corrections by mechanical, hydraulic, electric or electronic means, which involves considerable complications.

U.S. Pat. No. 3,348,342 describes a machine for manipulating members of considerable length, such as a wall structure, having a portal member, which is displaceable in such a manner as to embrace the parts to be machined by pressing on the wall panel. The portal member may move laterally and vertically along the profile of the member to be machined by means of bearing and guiding members. This machine is intended for polishing or trueing concrete beams, stone or wood, and these procedures cannot be used and are inapplicable in the fields for which the present invention is of interest, and moreover the workpiece serves exclusively as the bearing and rolling path for the machine without a balancing system, which renders manipulation difficult and does not make the machine functionally self-contained.

U.S. Pat. No. 2,988,934 describes an arrangement for drilling profile members. The arrangement follows the profile of the member, by pressing on the profiled workpiece by means of guide rollers, the spacing of which is adjustable. Measuring means are provided which indicate the exact position of the drills relative to the longitudinal and transverse sides of the profile. The guide rollers serve only for displacing the machine but do not serve for automatic adjustment of the position of the tools, which is effected manually, whereas the web or core member must be sensed independently.

U.S. Pat. No. 2,934,618 describes an arrangement for positioning the profiles on a table. A carriage displaceable on rails embodies pneumatic holding means for the member to be machined, so that the latter can be displaced longitudinally at the same time as the carriage is moved. The machining of the workpiece requires three movements and the holding means for the longitudinal displacement of the workpieces does not provide for automatic centering.

U.S. Pat. No. 3,113,373 describes a machine for drilling and riveting. The profile is secured on a support above which a carriage is moved, and on which are fixed various tools for effecting operations when the carriage is stopped. Means are provided to hold the carriage fixed during the work operations. The machine runs on ground rails independently of the machine support and does not possess any adjustment means or any balancing means.

Moreover, it is known that the means for setting the position of the portal member relative to the support is a pinion which engages a rack fixed to the support. Since the portal member is displaced on rails formed by rolling or bending and the pinion assembly moves with the portal member, there is a risk that the pinion does not correctly engage with the rack or tilts relative thereto.

It is an object of the present invention to avoid these disadvantages and to provide an apparatus including a main support, means on the support for displaceably carrying the workpiece, a portal member independently displaceable on the support and spanning the workpiece, a tool carrying cross member on the portal member, means for driving tools mounted on the cross member, means for vertically displacing said cross member on the portal member, presser elements on the portal member for engagement with the workpiece to exert a predetermined bearing pressure on the workpiece during machining, means supporting the cross member on the portal member to provide limited shift and rotational movement, locating means and gripper jaw means engageable with the workpiece for locating and positioning the latter, and a position-indicating device operating by geared engagement between the portal member and the support for positioning the portal member and the cross member at desired measured points of the length of the workpiece.

Such an apparatus may incorporate the following features together, separately or in combination:

a. the portal member rests both on the support member and on the workpiece in such a manner that the bearing force on the workpiece is precisely determined, so that a tool-carrying cross member can shift laterally and vertically and may rotate around its support axis to follow irregularities or deformations of the profile of the workpiece, by reason of bearing means on the portal member engaging the workpiece, which means are adjustable laterally and are rigid with the cross member in such a manner as to permit displacement of the said cross member while following the shape of the workpiece;

b. the portal member embodies self-centering means for engaging the workpiece and for displacing it longitudinally at the same time as the said portal member is displaced, thus centering it relative to the support or bench;

c. the support comprises severing means for the workpiece adapted to be displaced on the support;

d. the support comprises combined fixing and locating means for the workpiece being machined;

e. the travel path of the portal member on the support is substantially at the same level as the workpiece being machined;

f. the device for locating the position of the portal member incorporates an indicating device having a pinion engaging a rack which is rigid with the path of travel and is suspended from the portal member in such a manner as to be capable of slight lateral and vertical displacement relative to the portal member.

The portal member may rest on the support by means of profiled rollers resting on a rolling path having a rim part engageable by one or more grip pads, and the rollers being connected to the portal member by compensating connector means ensuring a constant force of the portal member on the workpiece. The portal member may also rest on the workpiece to be machined by rollers, the spacing of which is adjustable by a lead screw having opposed screw thread portions, the lead screw being rigid with the tool-carrying cross member.

Preferably the tool-carrying cross member is connected at its center part to the portal member by a joint permitting slight oscillation and horizontal displacement in the vertical plane of the cross member, the ends of the cross member being adapted to slide in vertical guideways.

The center joint of the tool carrying cross member is formed by a center member rigid with the cross member and having a spindle rotating in two slide blocks rigid with the portal member on the two sides of the center member; and oscillation of the center member is restricted by arcuate slots in the center member concentric with the spindle and traversed by pins connecting the slide blocks. Sliding motion of the slide blocks is facilitated by circulating roller tracks.

Compensating connecting means are provided which consist of hydraulic piston devices, and locking pads are incorporated, all of which are controlled by hydraulic piston devices. It is convenient to provide an arrangement in which one hydraulic device controls compensation and operates the locking pads.

Generally the cutting or severing means consist of a saw which is mounted on a carriage and utilizes the same positioning means as the portal member, which means are co-ordinated with the position of the abutment, which can be placed at different positions separated by a fixed amount or increment. The saw, or like, cutting means may have an index means combined with the floating zero of the means for positioning the portal member, so that this zero preselected on the portal member determines the length to be sawed off.

The combined means for fixing and locating the workpiece are formed by pairs of jaws which retract at the end of an opening movement, are associated with a locating finger movable in both directions. Each pair of jaws and each finger are controlled by lead screws which are driven by a motor and gear box through two torque limiting clutches.

The indicating device comprises means which constantly urge a pinion against a rack which is rigid with the rolling track independently of the movements of the portal member relative to the rack.

The indicating device comprises pinion rollers which are pressed against the rack member and center the pinion relative thereto and the indicator is supported opposite to the pinion by a pivot parallel to the rack and forming part of a horizontal plate suspended from the portal member by resilient blades which press the plate and the indicator device against the rack. The movements of the indicator relative to the portal member and parallel to the rack are limited by a vertical guide which is rigid with the plate and as close as possible to the rack to receive a displaceable member forming part of the indicator device.

According to another arrangement the portal member is fixed and the moving member is a displaceable power-operated support, and a feeler means is supported by a displaceable abutment.

With the above and other objects in view which will become apparent in the following detailed description, the present invention will be clearly understood in connection with the accompanying drawings, in which.

Figure 10:
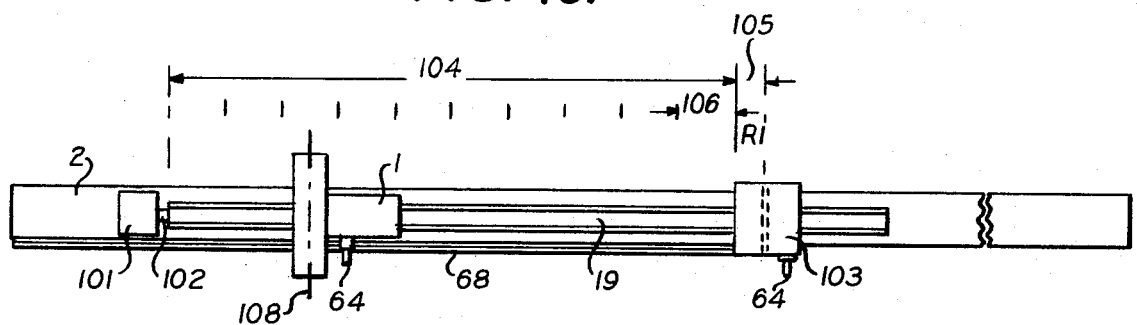
Figure 11:
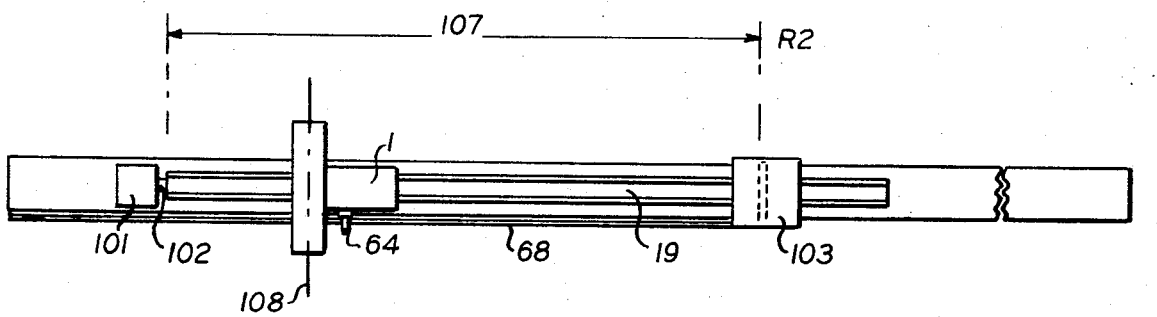

FIG. 10. is a top plan view partly broken away showing a saw with the portal member;

FIG. 11 is a top plan view similar to FIG. 10; and

Figure 12:
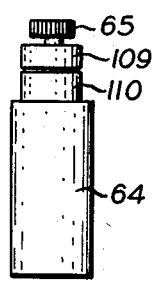

FIG. 12 is an elevational view of the register device.

The machine shown on the accompanying drawings comprises a portal member indicated generally at 1 resting on rails 17 carried by a support 2, by means of rollers 3, 4 and 5. The rollers 3, 4 and 5 embody a central fin 16 which fits into a slot in rails 17 of the support 2.

The portal member 1 comprises a tool-carrying cross member 6 which can be displaced vertically relative to the portal member 1 by means of hydraulic piston devices 7 and an adjusting screw 8 at the rear. The screw 8 is operated by a square operating head or by a hand wheel 15.

The cross member 6 is connected to the portal member 1 by means of a joint 50 permitting minor oscillations and minor limited horizontal displacement in the vertical plane of the cross member 6. The ends of the cross member are adapted to slide in vertical guides. For this purpose the hydraulic piston devices 7 are of square section and fit in housings in the cross member 6 which fit tightly to the sides of these square members; these housings serve as the vertical guides.

Figure 1:
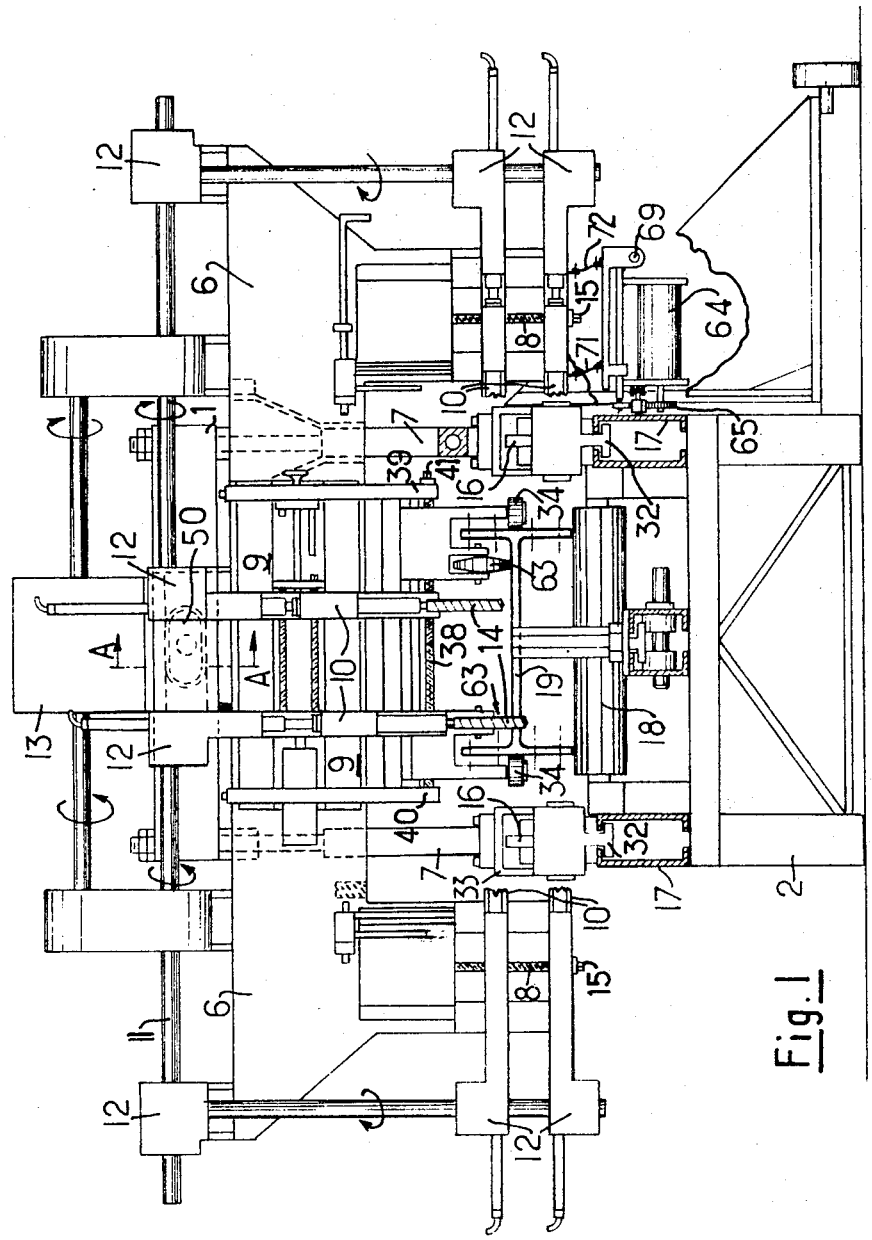
FIG. 1 is an elevation of the portal member and of a part of the support.
Figure 2:
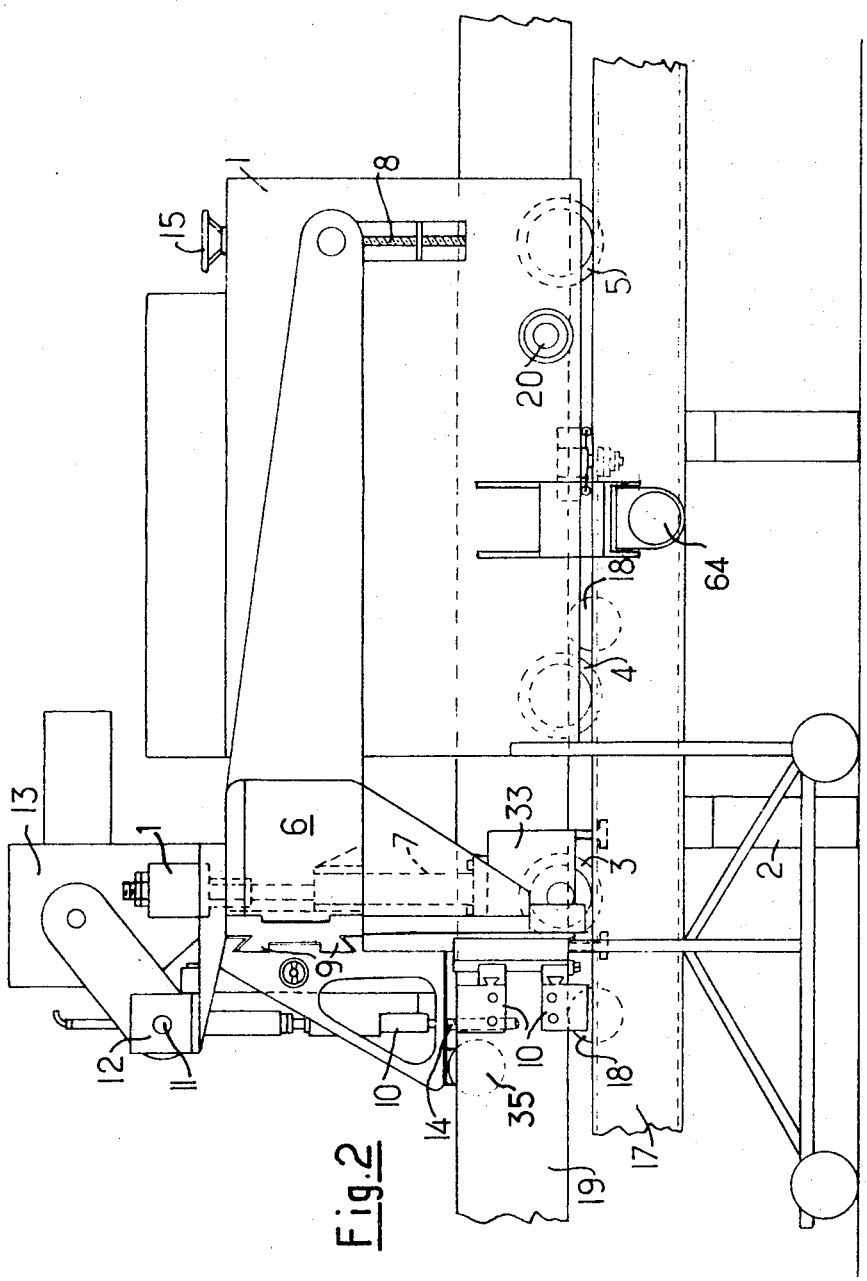
FIG. 2 is a side view of the whole machine.
Figures 3, 4:
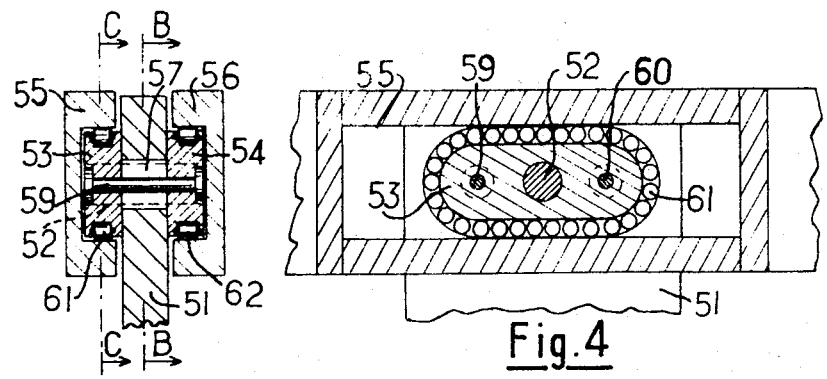
FIG. 3 is a partial section of the joint member forming part of the portal unit on the line A—A of FIG. 1.
FIG. 4 is a section on the line C—C of FIG. 3.
Figure 5:
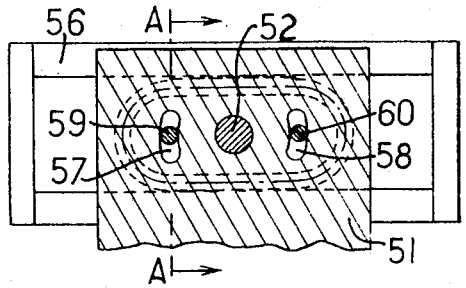
FIG. 5 is a section on the line B—B of FIG. 3.

The center joint 50 of the tool-carrying cross member 6 is formed by a central member 51 rigidly secured to the cross member 6 by means of a spindle 52, as shown in FIGS. 3 to 5. The spindle 52 rotates in two slide blocks 53 and 54 movable in guideways 55 and 56 rigid with the portal member 1. Oscillation of the central member 51 is limited by arcuate holes 57 and 58 in the central member 51 and concentric with the spindle 52; rods 59, 60 connecting the slide blocks pass through the arcuate holes 57 and 58. Movement of the slide blocks 53 and 54 within the guideways 55 and 56 is facilitated by roller tracks 61 operating in the manner of a circulating roller slide bearing.

The cross member 6 comprises a horizontal tool slide 9 carrying tool spindles 10 driven by a splined shaft 11 through angle drives 12. The shaft 11 is driven by an electric motor 13 and a suitable gear box. The advancing movement of cutting or other tools 14 fixed to the tool holders of the spindles 10 is effected by means of a hydraulic piston device for each holder.

It should be noted that the driving and feed of the cutting tools may be effected by other means, for example, by independent hydraulic, pneumatic or electric motors for each spindle.

The support 2 comprises a series of horizontal rollers 18 on which the workpiece member 19 to be machined rests, and which workpiece is an I-beam in the example illustrated. The workpiece 19, which fits beneath the portal member 1, may be gripped, shifted and centered laterally by clamp jacks 20 which move horizontally. It will be noted that the rails 17 are substantially at the same level as the beam 19. In this way when the centering jacks 20 are applied against the beam 19, the latter is made rigid with the portal member 1, which on being displaced carries the beam 19 with it, the latter running on the rollers 18 so as to position the beam at a predetermined point by engagement with a floating zero point. Since the jacks 20 are at the same level as the rollers 3, 4 and 5 there is practically no tilting force applied to the portal member 1 which thereby can operate upon heavy components for machining.

The support 2 comprises combined fixing and locating means for the beam 19 in the form of pairs of jaws 21 and 22 which are adapted to retract at the end of the opening movement. The pairs of jaws are associated with a locating finger 23 connected to a common control member 24. The jaws 21 and 22 are operated by nuts 25 receiving a lead screw 26 having opposite-hand screw-threaded sections. The jaws 21 and 22 are pivoted at 27 to the nuts 25 and they only project from the surface of the support 2 when they are forced upwardly by a guide 28 which acts on the rollers 29. The guide is sloped down at each end so that the rollers 29 no longer press on the jaws 21 and 22 when fully separated and the jaws then lie completely beneath the surface of the support 2.

The finger 23 is operated in a similar way to the jaws 21 and 22, for which purpose it is rigidly connected to a nut through which passes a screwed spindle 30. The screws 26 and 30 are operated by the control member 24 which comprises torque-limiting clutches as well as a driving motor 31. The driving motor 31 can be operated in one direction or the other so as to cause the jaws 21 and 22 to approach one another or to move apart and also to displace the finger 23 in one direction or the other. The torque-limiting clutches may comprise duplicated single clutches so that the screws 26 and 30 can be operated separately or together. The torque-limiting clutch of the screw 26 is adjusted to avoid excessive clamping forces by the jaws 21 and 22.

The reaction force of the drills or other tools 14 cutting holes in the beam 19 may be greater than the total weight of the portal member 1 which might lead to lifting thereof and disengagement of the rollers 3 from the rails 17, and in particular, the disengagement of the fin 16 from the groove in the guide rail 17. To prevent this the hydraulic piston devices 7 may be arranged to act in tension, by reversing the hydraulic fluid, on locking pads 32 which have a head engaging the inside of the rails 17. These rails 17 are advantageously formed by two channel members, which are formed by rolling or by bending, and the wing parts thereof face one another and are spaced by an amount sufficient to receive the fin 16. The heads of the pads 32 engage between the two channel members and limit the lifting of the portal member, since the pads which are connected to the bearing members or chocks 33 for the rollers 3 press from the under side against the upper wing parts of the channel rails 17.

The cross member 6 further comprises members carrying lateral rollers 34 and top rollers 63 which serve in particular to assist the introduction of the beam 19 beneath the portal member. These rollers 63 are the only members which press on the beam when the portal member is practically fully disengaged, for example, at the end of machining.

An important feature of the machine according to the invention is that the portal member is partially supported on the beam 19 by the rollers 63 and 34. The spacing of the rollers 63 and 34 is adjustable by means of an axial screw 38 having screw threads of opposite pitch. The screw 38 may rotate in brackets 39 and 40 which are rigid with the tool-carrying cross member 6. The rollers 34 may be rotatably adjusted by means of a square head member 41. The cross member can shift slightly laterally, vertically and rotatably to a small extent to follow the profile of the beam 19, since the rollers 34 and 63 communicate their movements to the cross member 6. In this way, even if the beam 19 is deformed, twisted, curved or corrugated, the cutting tools 14 cut holes at the desired points, that is, in the axis of the cant lines. The hydraulic piston devices 7 are controlled by a hydraulic distributor, ensuring a variable force on the devices, in such a manner that a constant force is applied to the beam 19 by means of the rollers 63.

It is advantageous to provide on the same support 2, a means for cutting the beam 19 to a length which has not been shown on the drawings. This cutting means, generally a saw device, is placed on a carriage and utilizes the same position locating means as the portal member. These reference means are co-ordinated with the position of one or more abutments, not shown, against which the beam 19 is pressed and which may be placed at predetermined points separated by a fixed increment. This distance could be for example 1 m. In this way, the beam 19 could be cut at the same time that the drilling is performed at a different point. Since the cutting time is generally less than the drilling time, it is easy to effect the two operations simultaneously with a substantial gain of time. Moreover, it is possible to economize in the provision of a cutting device and a measuring tape, which devices are generally provided with their own power means and are relatively costly.

As a second solution, the cutting means is also movable so as to permit its disengagement during drilling. It includes a reference abutment in such manner that cutting is effected always at the same position. For this purpose the portal member incorporates a measuring device with a floating zero reference which can be zeroized at any point of the support, as well as a concealable abutment which permits the workpiece to be clamped at a constant distance during location of the workpiece. It is then only necessary to shift the workpiece to the previously selected zero distance for the desired length to be cut from the workpiece. This arrangement permits operation by measuring from the preadjusted abutments or from an abutment fixed at predetermined known points.

With the machine described comprising both a drilling portal and a cutting device or saw and which, moreover, comprises abutments at predetermined intervals of, for example 1 m, if it is desired for example to cut a beam 19 to a length of 10.3 m, the operator places the beam 19 on the abutment member 10 and then moves the saw to the 0.30 m marking and starts the sawing operation. Consequently, it will be seen that it is possible to save a measuring scale equipment having a separate drilling device and a saw, which would moreover necessitate a locating support between them.

It will be seen that the centering system using hydraulic piston devices 20 makes it possible to avoid the need for a rollway with power driven rollers while maintaining rapid manipulation of the beam 19 as is required for various applications where accurate machining of structural profiles is required and where centering of the workpiece is essential for placing the cross members over the workpiece.

Figures 6, 7:
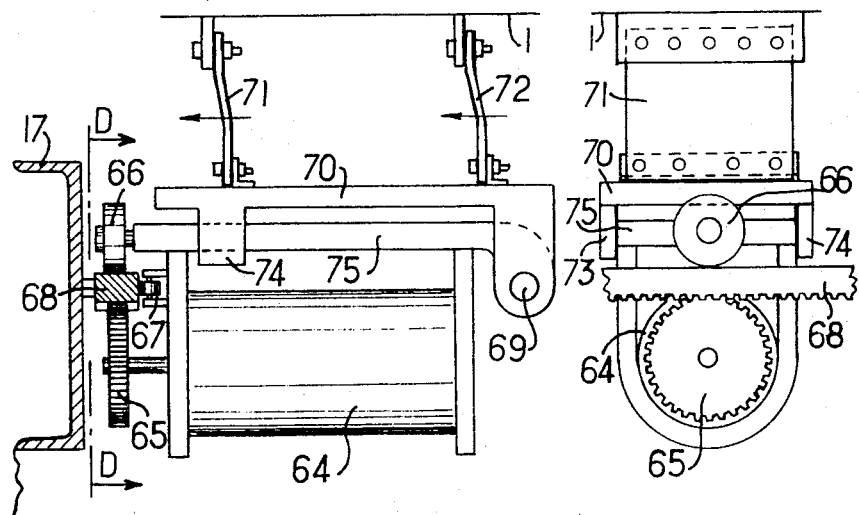
FIG. 6 is a side view of the indicator device.
FIG. 7 is a section of FIG. 1 on the line D—D.
Figure 8:
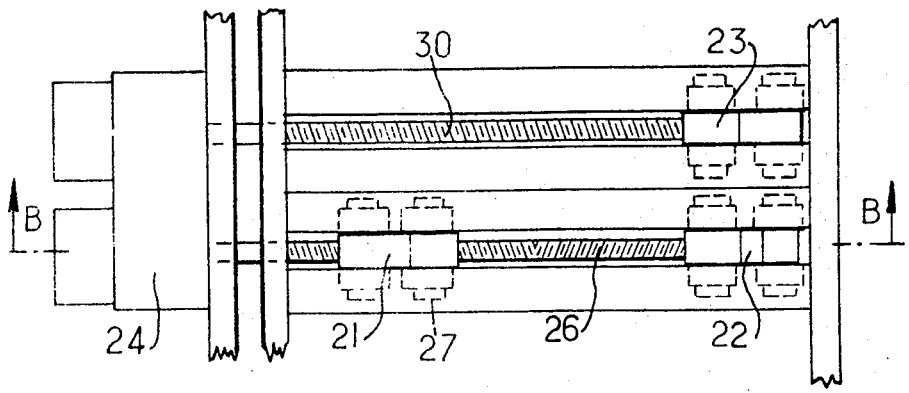
FIG. 8 is a plan view of combined means for fixing and locating the workpiece being handled.
Figure 9:
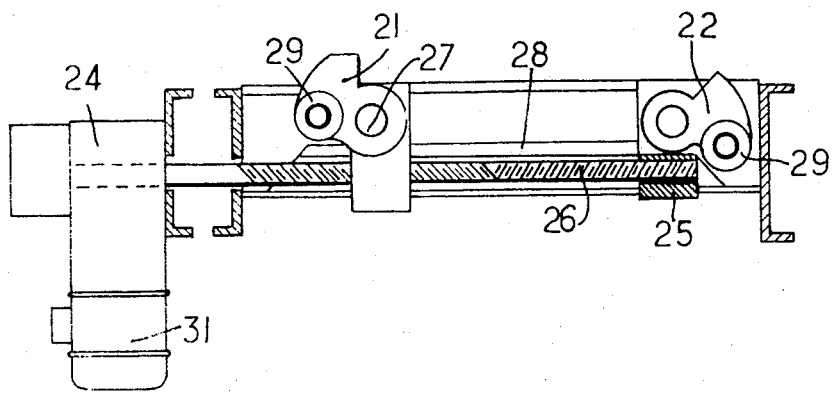
FIG. 9 is a section on the line B—B of FIG. 8.

A position indicating device 64 is shown in FIGS. 6 and 7 and comprises a pinion 65 and adjacent guide rollers 66 and 67, all of which engage a rack 68 fixed to the rails 17. The rollers 66 and 67 locate the pinion 65 relative to the rack 68. The indicator device 64 is supported on the side opposite to the pinion 65 by a joint 69 on an axis parallel to the rack 68 which forms part of a horizontal plate 70 suspended from the portal member 1 by spring blades 71 or 72 which press the plate 70 and the indicator device 64 towards the rack 68. Movements of the indicator device 64 relative to the portal member 1, which movements are parallel to the rack 68, are limited by vertical guides 73, 74 fixed to the plate 70 and as close as possible to the rack 68, so as to receive a member 75 rigid with the indicator device 64. In this way small vertical and lateral oscillations of the portal member 1 are unable to affect the engagement of the indicator device 64 with the rack 68.

While I have disclosed one embodiment of the present invention, it is to be understood that this embodiment is given by example only and not in a limiting sense.

FIG. 10 shows the saw 103 on the same support 2 as that of the portal member 1. The saw 103 and the portal member 1 each have a numerical register 64. The carriage 101 which supports the stop or end 102 blocks the metric division 106. In the example, last paragraph of page 13 of the specification and the beginning of page 14, there is disclosed the end displaced for cutting a workpiece at more than 10 m but less than 14 m. The register device 64 of the saw 103 registers only a minimum distance of 1 m. In the example shown, a distance 105 is 0.3 m.

FIG. 11 discloses the saw 103 cutting always at the same point R₂ of the portal member 1, in the cuts of a length 107. The carriage 101 is displaceable from the stop 102. The portal member 1 must be displaced from the end 102 and on the saw 103.

The numerical register device 104 must have a controllable zero to start, for example, from the position from the end 102.

FIG. 12 shows the register device having an electromagnetic means 109 which provides a disconnection of the current and an electromagnet 110 which operates as a brake if the current is fed. It will suffice to feed electric current for breaking and for disconnecting and to cut the electric current in order to disconnect and free the brake.

If one feeds the current, one disconnects the pinion 65. One can change the origin of the portal member and thereby the size of the cut. Other means can be used such as integral calculators or counters.

What I claim is:

1. Apparatus for machining elongated workpieces comprising a main support, means on said support for displaceably carrying the workpiece, a portal member independently displaceable on said support and spanning the workpiece, a tool-carrying cross member on said portal member, means for driving tools mounted on said cross member, means for vertically displacing said cross member on said portal member, presser elements on the portal member for engagement with the workpiece to exert a predetermined bearing pressure on the workpiece during machining, means supporting the cross member on the portal member to provide limited shift and rotational movement, locating means and gripper jaw means engageable with the workpiece for locating and positioning the latter, and a position indicating device operating by geared engagement between the portal member and the support for positioning the portal member and the cross member at desired measured points of the length of the workpiece.

2. Apparatus for machining elongated workpieces comprising
   a support on which the workpieces to be machined are supported,
   a portal member surrounding them and displaceable along said support,
   a tool-carrying cross member adjustable in position on said portal member,
   a support axle for supporting said tool-carrying cross member,
   measuring means for checking the position of the portal member,
   means for supporting said portal member on said support and on the workpiece,
   said tool-carrying cross member being shiftable laterally and vertically and rotatable around said support axle to follow the configuration of said workpiece, and
   bearing means on said portal member engaging the workpiece being adjustable laterally and rigid with said cross member.

3. Apparatus according to claim 2, further comprising
   self-centering means on said portal member for engaging the workpiece and for displacing it longitudinally at the same time as said portal member is displaced, centering it relatively to the support.

4. Apparatus according to claim 2, further comprising
   severing means on said support for the workpiece, and
   said severing means being displaceable on the support.

5. Apparatus according to claim 2, further comprising
   combined fixing and gripper means on said support for the workpiece being machined.

6. Apparatus according to claim 2, wherein
   the travel path of said portal member on said support is substantially at the same level as said workpiece being machined.

7. Apparatus according to claim 2, further comprising means for locating the position of said portal member and incorporating an indicating device, a rack rigid with said support and suspended from the portal member and displaceable slightly laterally and vertically relative to said portal member and said indicating device having a pinion engaging said rack.

8. Apparatus according to claim 2, wherein said means for supporting said portal member on the support comprises profiled rollers resting on a rolling guide, at least one grip pad, said profiled rollers having ribs and said rolling guide being engageable by said at least one grip pad, and compensating connector means for connecting said profiled rollers to said portal member and for ensuring a constant force of said portal member on the workpiece.

9. Apparatus according to claim 2, wherein said means for supporting said portal member on the workpiece to be machined comprises rollers, lead screw means having opposed screw threaded portions for adjusting the positions of said rollers, and said lead screw means being fixed to said tool-carrying cross member.

10. Apparatus according to claim 2, further comprising a center joint means for connecting said tool-carrying cross member at its center part to said portal member and for permitting slight oscillation and horizontal displacement in the vertical plane of the said cross member, and vertical guides on which the ends of said cross member are slidable.

11. Apparatus according to claim 10, wherein said center joint of the tool-carrying cross member is formed by a center part rigid with said cross member and including, a spindle rotating in two slide blocks rigid with said portal member on two sides of said center part, and said center part is formed with arcuate slots concentric with said spindle, pins traversing said arcuate slots and connecting said two slide blocks for restricting oscillation of said center part by said arcuate slots and pins.

12. Apparatus according to claim 11, further comprising circulating roller track means for facilitating sliding motion of said slide blocks.

13. Apparatus according to claim 2, further comprising compensating connecting means comprising hydraulic piston means for actuating said tool carrying cross-member.

14. Apparatus according to claim 13, further comprising hydraulically controlled locking pad means for preventing lifting of said cross member.

15. Apparatus according to claim 14, wherein said hydraulic piston means for controlling compensation and for operating the locking pads.

16. Apparatus according to claim 2, further comprising severing means comprising a saw mounted on a carriage, an abutment, positioning means for said portal member and said severing means, and said positioning means being coordinated with the position of said abutment when at different positions separated by a fixed increment.

17. Apparatus according to claim 16, wherein said cutting means has an index means including a floating zero means for positioning the portal member and for determining a cut length by said zero preselected on said portal member.

18. Apparatus according to claim 2, further comprising combined means for fixing and locating the workpiece and comprising pairs of retractable jaws which are retractable at the end of an opening movement, and a locating finger movable in two directions operatively connected with said each of said pairs of retractable jaws.

19. Apparatus according to claim 18, further comprising screw means, two torque limiting clutches, a motor and gear box means for driving through two torque-limiting clutches said screw means, and said screw means being used for controlling each pair of jaws and finger.

20. Apparatus according to claim 7, wherein said indicating device comprises means for urging said pinion constantly against said rack rigid with a rolling track independently of the movements of said portal member relatively to the rack.

21. Apparatus according to claim 7, wherein said rack is stationary, said indicator device comprises an indicator drive pinion means and engagement roller means urged constantly against said rack for centering the pinion relatively to said rack, a pivot joint, a rotary scale member connected to said pinion and supported by said pivot joint operative on an axis parallel to said rack and constituting part of a horizontal plate, resilient blade spring means for suspending said horizontal plate from said portal member, said resilient blade spring means being used for constantly pressing said plate and said rotary scale member towards said rack.

22. Apparatus according to claim 21, further comprising vertical guide means for restricting movements of said scale member in a direction parallel to said rack, said vertical guide means being rigid with said plate and positioned close to said rack, said guide means being used for guiding said indicator device for sliding movement thereof and for maintaining engagement of said pinion and said rack during displacement of said portal member.

* * * * *